(12) United States Patent
Celona et al.

(10) Patent No.: US 8,589,189 B2
(45) Date of Patent: Nov. 19, 2013

(54) METHOD AND SYSTEM TO DISPLAY DATA

(75) Inventors: John Celona, Livermore, CA (US);
Jeffrey Barr, San Jose, CA (US);
Sheldon X. Wang, San Rafael, CA (US)

(73) Assignee: Ehealthinsurance Services, Inc., Mountain View, CA (US)

(*) Notice: Subject to any disclaimer, the term of this patent is extended or adjusted under 35 U.S.C. 154(b) by 2360 days.

(21) Appl. No.: 11/264,878

(22) Filed: Nov. 1, 2005

(65) Prior Publication Data

US 2007/0100670 A1  May 3, 2007

(51) Int. Cl.
*G06Q 40/00* (2012.01)

(52) U.S. Cl.
USPC .................................................. 705/4

(58) Field of Classification Search
USPC ........................................... 705/4, 10
See application file for complete search history.

(56) References Cited

U.S. PATENT DOCUMENTS

| | | | |
|---|---|---|---|
| 6,594,635 B1* | 7/2003 | Erlanger | 705/4 |
| 7,080,020 B1* | 7/2006 | Klaus | 705/4 |
| 7,392,202 B1* | 6/2008 | O'Brien | 705/4 |
| 2002/0049617 A1* | 4/2002 | Lencki et al. | 705/4 |
| 2002/0111835 A1* | 8/2002 | Hele et al. | 705/4 |
| 2002/0116231 A1* | 8/2002 | Hele et al. | 705/4 |
| 2004/0172310 A1* | 9/2004 | Atlee et al. | 705/4 |
| 2005/0038681 A1* | 2/2005 | Covert | 705/4 |
| 2005/0240451 A1* | 10/2005 | Johnson et al. | 705/4 |
| 2006/0293928 A1* | 12/2006 | Schumacher et al. | 705/4 |

OTHER PUBLICATIONS

Visitors and Travelers Medical Insurance, Path2USA, Oct. 3, 2004.*
Calhealth.net, Aug. 2003.*

* cited by examiner

*Primary Examiner* — Olabode Akintola
*Assistant Examiner* — Abhishek Vyas
(74) *Attorney, Agent, or Firm* — Schwegman Lundberg Woessner P.A.

(57) ABSTRACT

A system and method are provided to communicate insurance information to a user via a networked-based system. The method may comprise receiving application details from a user which are then processed to identify a plurality of available insurance plans for the user. Thereafter, a recommended group of plans from the available plans may be identified based on historical insurance plan data which identifies which insurance plans received a number of approved applications exceeding a predefined threshold of applications. The recommended group is then presented via the networked-based system to the user via a GUI. The GUI may include an icon to identify insurance plans that received a number of applications exceeding the predefined threshold of applications, and a plurality of further icons. When a user moves a graphical pointer over an icon, a window including brief information related to the insurance plan benefit may be displayed.

24 Claims, 18 Drawing Sheets

EHEALTHINSURANCE

| HOME | INDIVIDUALS & FAMILIES | SMALL BUSINESSES |

HEALTH INSURANCE | SHORT-TERM HEALTH INSURANCE | STUDENT HEALTH INSURANCE | HSAs | DENTAL | LIFE

INDIVIDUAL & FAMILY HEALTH INSURANCE PLANS

40 ⇘

| | GENDER | DATE OF BIRTH MM / DD / YY | TOBACCO USAGE IN LAST 12 MONTHS? | FULL-TIME COLLEGE STUDENT? |
|---|---|---|---|---|
| APPLICANT*: | MALE | 07 / 14 / 1961 | ☐ | ☐ |
| 42 ⇗ SPOUSE | FEMALE | 12 / 28 / 1967 | ☐ | ☐ |
| CHILD | FEMALE | 10 / 15 / 2001 | ☐ | ☐ |
| CHILD | — | / / | ☐ | ☐ |

ADD CHILDREN

44 ⇗ ZIP CODE  95138          I WANT MY COVERAGE TO BEGIN ON : 10/15/2005

46 ⇘ GET QUOTES

*FIG. 3*

| HOME | INDIVIDUALS & FAMILIES | SMALL BUSINESSES |

HEALTH INSURANCE | SHORT-TERM HEALTH INSURANCE | STUDENT HEALTH INSURANCE | HSAs | DENTAL | LIFE

▷ COMPARE INDIVIDUAL & FAMILY HEALTH INSURANCE PLANS

| SELECT BY: | >TOP 25 PLANS | ALL PLANS | PLAN ADVISOR | CUSTOM SEARCH |
|---|---|---|---|---|
|  | 24 PLANS | 76 PLANS | SELECT | SELECT |
| SORT BY: | ⊙ EHEALTH'S PICKS* | ○ PRICE | ○ COMPANY | ○ DEDUCTIBLE |

CHECK UP TO 4 PLANS, THEN [COMPARE] > ☑

| Rx | NO APP FEE | eV | | | [COMPARE] > ☐ |

ACTIVE START PLAN 35         ☆ SPONSORED
BENEFIT DETAILS   FIND DOCTORS         🏅 BEST SELLER
AM BEST RATING: A-
PLAN HIGHLIGHT: GET VALUE RIGHT AWAY WITH NO MEDICAL DEDUCTIBLE TO MEET! MEMBERS BENEFIT FROM LOW, COPAYS FOR OFFICE VISITS AND $8 GENERIC DRUG COPAYS. WITH LOW RATES AND FIXED COPAYS ITS A PLAN THAT YOU CAN AFFORD TO USE WHEN YOU NEED IT.

| PLAN TYPE | DEDUCTIBLE | COINSURANCE | OFFICE VISIT | MONTHLY PREMIUM |
|---|---|---|---|---|
| PRO | $0 | 40% | $35 | $128.00 |

[APPLY]

| Rx | NO APP FEE | eV | 🐷 | | [COMPARE] > ☐ |

SHIELD SPECTRUM PPO SAVINGS PLAN 4000         ☆ SPONSORED
BENEFIT DETAILS   FIND DOCTORS   HSA OPTIONS
AM BEST RATING: A-
PLAN HIGHLIGHT: AFFORDABLE HEALTH COVERAGE, PLUS COMPATIBILITY WITH A TAX-ADVANTAGED HEALTH SAVINGS ACCOUNT (HSA) HELPS YOU SAVE HEALTH CARE DOLLARS. THE PPO SAVINGS PLAN 4000'S LOW MONTHLY PREMIUMS, FIXED COPAYMENTS FOR PREVENTIVE CARE AND REDUCED COSTS FOR PRESCRIPTIONS (AT PARTICIPATING PHARMACIES) HELP YOU CONTROL YOUR HEALTHCARE COSTS.

| PLAN TYPE | DEDUCTIBLE | COINSURANCE | OFFICE VISIT | MONTHLY PREMIUM |
|---|---|---|---|---|
| PRO | $4000 | 0% | YOU PAY NOTHING AFTER DEDUCTIBLE | $92.00 |

[APPLY]

*FIG. 4*

▷ SPONSORED INSURANCE PLANS

SPONSORED

SPONSORED INSURANCE PLANS ARE PAID LISTINGS THAT INSURANCE COMPANIES HAVE ACQUIRED FOR THE PURPOSE OF HIGHLIGHTING THEIR PRODUCTS FOR COMSUMERS. AS PART OF THE ADVERTISEMENT, INSURANCE COMPANIES MAY FEATURE PLANS WHICH, IN THE INSURANCE COMPANY'S OPINION, MAY BE OF PARTICULAR INTEREST TO CONSUMERS.

WE ENCOURAGE YOU TO REVIEW ALL INSURANCE PLANS AVAILABLE IN YOUR AREA, CAREFULLY READ ALL INSURANCE PLAN DETAILS, AND CONSIDER THE SPECIFIC NEEDS OF YOU AND YOUR FAMILY BEFORE CHOOSING A HEALTH INSURANCE PLAN. YOU CAN REVIEW DETAILS BY CLICKING THE "DETAILS" LINK FOR EACH INSURANCE PLAN. YOU CAN ALSO COMPARE UP TO 4 INSURANCE PLANS BY CHECKING THE BOX TO THE LEFT OF EACH INSURANCE PLAN AND CLICKING THE "COMPARE" BUTTON.

IF YOU NEED ANY MORE INFORMATION, PLEASE CALL US SO THAT ONE OF OUR REPRESENTATIVES CAN ASSIST YOU .

☒ CLOSE

*FIG. 8*

▷ BEST SELLER

BEST SELLER

THE "BEST SELLER" SYSTEM DESIGNATES ONE OF EHEALTHINSURANCE'S TOP SELLING INSURANCE PLANS IN YOUR STATE FOR CATEGORIES OF APPLICANTS. THE CATEGORIES ARE: SINGLE APPLICANTS, SINGLE APPLICANTS WITH ONE OR MORE CHILDREN, FAMILY APPLICANTS (TWO ADULTS AND ONE OR MORE CHILDREN), OR MULTIPLE ADULT APPLICANTS. WE'VE USED THE INFORMATION YOU ENTERED PREVIOUSLY TO MATCH YOU INTO THE FAMILY APPLICANT CATEGORY. CATEGORY MATCHING DOES NOT TAKE INTO ACCOUNT YOUR SPECIFIC HEALTH CONDITIONS OR NEEDS. A HEALTH INSURANCE PLAN IS DESIGNATED A BEST SELLER BASED ON THE NUMBER OF APPLICATIONS SUBMITTED THROUGH EHEALTHINSURANCE AND APPROVED BY THE INSURANCE COMPANY DURING THE MOST RECENT CALENDAR QUARTER.* THIS BEST SELLER DESIGNATION IS FOR INFORMATIONAL PURPOSES ONLY.

THE BEST SELLER DESIGNATION IS THE ONLY ONE FACTOR TO BE CONSIDERED WHEN SELECTING A HEALTH INSURANCE PLAN. PLEASE CONSIDER THE SPECIFIC NEEDS OF YOU AND YOUR FAMILY BEORE SELECTING AN INSURANCE PLAN THAT IS RIGHT FOR YOU. WE ENCOURAGE YOU TO CAREFULLY READ INSURANCE PLAN DETAILS BY CLICKING THE "DETAILS" LINK OF EACH INSURANCE PLAN YOU ARE CONSIDERING BEFORE DECIDING WHICH INSURANCE PLAN IS BEST FOR YOU. IF YOU NEED MORE INFORMATION, PLEASE CALL US SO THAT ONE OF OUR AGENTS CAN ASSIST YOU.

*DATA IS BASED ON APPLICATIONS SUBMITTED BETWEEN 4/1/05 AND 6/30/05 AND APPROVED BY THE INSURANCE COMPANY BEFORE 8/2/05. OUR BEST SELLER PLANS ARE TYPICALLY UPDATED WITHIN 45 DAYS OF EACH QUARTER'S END. PLEASE NOTE THAT NOT ALL BEST SELLER PLANS MAY BE AVAILABLE IN YOUR AREA.

☒ CLOSE

*FIG. 9A*

 FEATURED

FEATURED

"FEATURED PLANS" ARE PLANS IDENTIFIED BY EHEALTHINSURANCE, WHICH WE BELIEVE, MAY BE OF INTEREST TO YOU BASED ON THE FOLLOWING CRITERIA:

1) THE PLAN IS BEING OFFERED IN YOUR AREA FOR THE FIRST TIME ON OUR WEBSITE; AND/OR

2) THE PLAN WAS THE BEST SELLING PLAN IN YOUR AREA DURING THE PRIOR QUARTER, BASED ON APPLICATIONS SUBMITTED THROUGH OUR WEBSITE AND APPROVED BY THE INSURANCE COMPANY.

PLEASE NOT THAT THE SELECTION OF A PARTICULAR PLAN AS A "FEATURED PLAN" DOES NOT CONSTITUTE A RECOMMENDATION TO PURCHASE SUCH PLAN. WE ENCOURAGE YOU TO REVIEW ALL INSURANCE PLANS AVAILABLE IN YOUR AREA, CAREFULLY READ ALL INSURANCE PLAN DETAILS, AND CONSIDER THE SPECIFIC NEEDS OF YOU AND YOUR FAMILY BEFORE SELECTING A HEALTH INSURANCE PLAN. WE ENCOURAGE YOU TO UTILIZE ANY OF THE TOOLS AND INFORMATION OUR SITE HAS TO OFFER, AND TO REVIEW THE DETAILS OF EACH PLAN YOU CONSIDER, PRIOR TO SELECTING A PLAN.

IF YOU HAVE ANY QUESTIONS ABOUT THIS OR ANY PLAN, PLEASE CALL US AT 800-977-8860 AND ONE OF OUR AGENTS WILL BE HAPPY TO ASSIST YOU.

*FIG. 9B*

 TOP 25

TOP 25

A "TOP 25" SYMBOL DESIGNATES A HEALTH INSURANCE PLAN IDENTIFIED BY EHEALTHINSURANCE AS BEING ONE OF UP TO 25 PLANS* IN YOUR AREA, WHICH WE BELIEVE MAY BE OF INTEREST TO YOU BASED ON THE FOLLOWING CRITERIA:

1) THE PLAN WAS OFFERED FOR THE FIRST TIME IN YOUR AREA DURING THE MOST RECENT CALENDAR QUARTER; OR

2) THE PLAN WAS ONE OF UP TO TOP 25 BEST SELLING PLANS IN YOUR AREA DURING THE MOST RECENT CALENDAR QUARTER, BASED ON APPLICATIONS SUBMITTED THROUGH OUR WEBSITE AND APPROVED BY THE INSURANCE COMPANY.

THE "TOP 25" DESIGNATION IS FOR INFORMATIONAL PURPOSES ONLY. PLEASE NOTE THAT THE SELECTION OF A PARTICULAR PLAN AS A "TOP 25" PLAN DOES NOT CONSTITUTE A RECOMMENDATION TO PURCHASE SUCH PLAN. WE ENCOURAGE YOU TO REVIEW ALL INSURANCE PLANS AVAILABLE IN YOUR AREA, CAREFULLY READ ALL INSURANCE PLAN DETAILS, AND CONSIDER THE SPECIFIC NEEDS OF YOU AND YOUR FAMILY BEFORE SELECTING A HEALTH INSURANCE PLAN. WE ENCOURAGE YOU TO UTILIZE THE TOOLS AND INFORMATION OUR WEBSITE OFFERS AND TO REVIEW THE DETAILS OF EACH PLAN YOU CONSIDER, PRIOR TO SELECTING A PLAN.

IF YOU HAVE ANY QUESTIONS ABOUT THIS INSURANCE PLAN OR ANY OTHER PLAN, PLEASE CALL US AT 800-977-8860 AND ONE OF OUR AGENTS WILL BE HAPPY TO ASSIST YOU.

* CERTAIN AREAS MAY HAVE LESS THAN 25 HEALTH INSURANCE PLANS WITH A "TOP 25" DESIGNATION.

 CLOSE

*FIG. 9C*

METHOD AND SYSTEM TO DISPLAY DATA

TECHNICAL FIELD

The present application relates generally to the technical field of displaying data in a network-based system.

BACKGROUND

Websites now enable users/applicants to obtain insurance (e.g. health insurance) online via the Internet. However, such websites typically present users simultaneously (e.g., via a single display screen) with a vast amount of detail making it difficult for users to clearly identify what benefits are associated with a particular health insurance plan. Some insurance carriers insist on certain detail being displayed and hence a web page of the online insurance provider may be even more cluttered with information. This is because the health insurance industry is a highly regulated one in which health insurance carriers who underwrite their health insurance plans, and brokers or agents who sell those plans must strictly comply with federal laws that regulate security, privacy and personal medical information (e.g., comply with The Health Insurance Portability and Accountability Act of 1996; Gramm-Leach Bliley Act of 1999, and so on). A broker's sales activity is governed by each state in which it operates. If it operates on the Internet, then the broker must comply with the separate rules of each of the fifty states. A broker operating via the Internet must also present a carrier's health insurance plans in a manner that complies with the laws governing the carrier's activities and carriers are regulated by each state as well.

Given this complex regulatory scheme, a user seeking a health insurance plan can often be subjected to information overload. Users desire a simple user interface that clarifies the benefits offered by various health insurance providers. Moreover, unlike the typical Internet shopping experience where a user simply selects and purchases a product, a user seeking health insurance must select and then apply for a health insurance plan. The application will be reviewed by the carrier and only after the carrier approves the application will a user obtain the desired health insurance plan. Thus, users also need to be able to identify the health plans that are more likely to approve their applications.

Finally, health insurance plans are not only user/applicant specific but also geographical location specific. Thus, for each different zip code, there may be different health insurance plans; there are no national plans. Further, it will be appreciated that the information required from a user in order to ascertain which insurance plan is appropriate for the user may differ from user to user.

What is needed then is a process for presenting health insurance information that, on the one hand, complies with all of the regulations governing the sale of health insurance, and on the other is easy to understand.

SUMMARY

According to one example embodiment, there is provided a system and a method of communicating insurance information to a user via a networked-based system.

The invention extends to a machine-readable medium including instructions for performing any one or more of the methodologies described herein.

Other features will be apparent from the accompanying drawings and from the detailed description that follows.

BRIEF DESCRIPTION OF THE DRAWINGS

Embodiments of the present invention are illustrated by way of example, and not limitation, in the figures of the accompanying drawings, and in which like references indicate the same or similar elements.

In the drawings,

FIG. 3 shows an example Graphical User Interface (GUI) for capturing application details or information from a client device;

FIG. 4 shows an example Graphical User Interface (GUI) for displaying insurance plan details on a client device;

FIG. 8 shows an example of a sponsored insurance plan window;

FIG. 9A shows an example of a best seller window;

FIG. 9B shows an example of a featured insurance plan window;

FIG. 9C shows an example of a top 25 insurance plan window;

DETAILED DESCRIPTION

A method and a system of recommending and displaying insurance information (e.g., information about a health insurance plan) to a user via a networked-based system are described. In the following description, for purposes of explanation, numerous specific details are set forth in order to provide a thorough understanding of example embodiments of the present invention. It will be evident, however, to one skilled in the art that the present invention may be practiced without these specific details.

Figure 1:
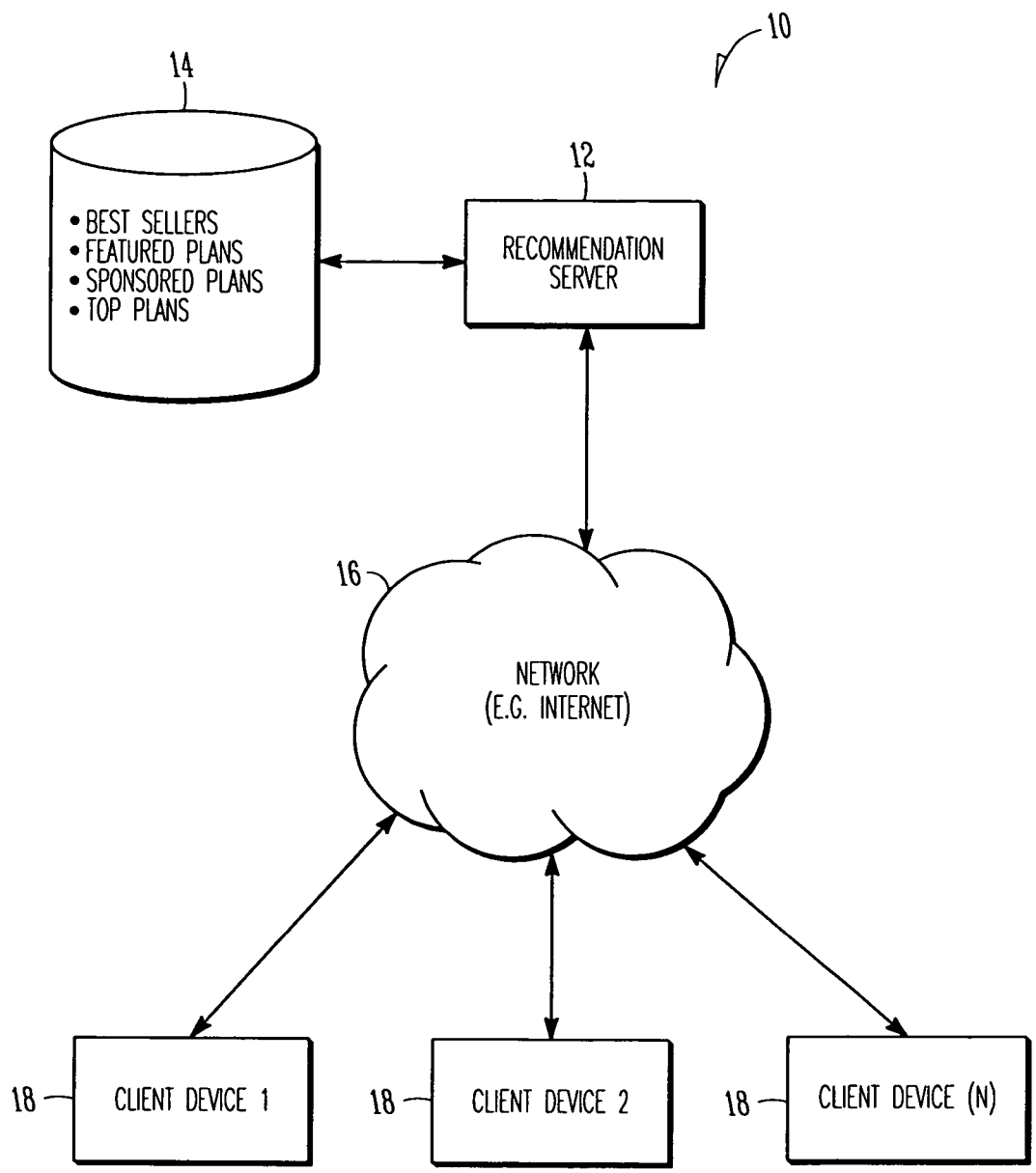
FIG. 1 shows a schematic architectural overview of an example embodiment of a network-based system for recommending and displaying health insurance plans to a user.

Referring to FIG. 1, reference 10 generally shows a schematic architectural overview of an example embodiment of a network-based system for recommending and displaying health insurance plans to a user. The network-based system 10 is shown to include a recommendation server 12 (including display modules) with an associated database 14 including information on best seller insurance plans, featured insurance plans, sponsored insurance plans, top plans a plurality of questions, a plurality of answers, and insurance plan data to provide health insurance plan recommendation(s) to the user.

The best seller insurance plans in the database 14 may be a subcategory of the plans available to a user in a geographic zone. The best seller plans may be organized by geographic zone and type of user (e.g. single user, single user with one or more children, family applicants (two adults and one or more children), or multiple adult users); plans may be identified as best sellers based on historical data indicating which plans have approved the highest number of previous users in a given time period (e.g. a fiscal quarter).

The featured insurance plans in the database 14 may also be a subcategory of the plans available to a user in a geographic zone. The featured plans may, for example, be organized by geographic zone and type of user; plans may be identified as featured when they represent a new plan being introduced to consumers or if the plan was identified as a best seller in a previous period.

The sponsored plans in the database 14 may also be a subcategory of the plans available to a user in a geographic zone. The sponsored plans may be organized by geographic zone and type of user; sponsored insurance plans may be plans that are paid listings that the insurance companies have acquired for the purpose of highlighting their products for consumers; plans may be identified as sponsored when a specific carrier requests that the plan be highlighted. Thus, the sponsored plans may in effect be advertisements.

Top plans in the database 14 may also be a subcategory of the plans available to a user in a geographic zone; a set number of plans may be designated as top plans (e.g. 25). In an example embodiment, the top 25 plans are organized by geographic zone and type of user; plans may be identified as top 25 based on the plan being newly introduced or the plan being a top 25 best selling plan in the most recent calendar quarter.

The recommendation server 12 communicates via one or more networks, such as the Internet 16, with a plurality of client devices 18. The client devices 18 may, for example, include a personal computer (PC), a Personal Digital Assistant (PDA), a cellular telephone, or any other client device including a display. The client devices 18 may be connected wirelessly and/or in a wired fashion with the recommendation server 12 via the Internet 16. As described in more detail below, the user or applicant (e.g. a person investigating or seeking a health insurance plan) may interact with the recommendation server 12 in order to obtain a recommendation of one or more health insurance plans relevant to the user's needs. The recommendation server 12 then displays a plurality of recommended insurance plans based on set criteria (e.g., historical insurance data (including geographical data)). In an example embodiment, a plurality of icons is provided. The plurality of icons may include a prescription drug coverage icon to identify that the associated insurance plan includes prescription drug coverage, a fee identification icon to identify if the associated insurance plan has an application fee, an electronic signature icon to identify that an application for the associated health insurance plan can be digitally signed, a maternity icon to identify that an associated insurance plan provides maternity benefits, and a Health Savings Account (HSA) icon to identify that the associated insurance plan provides health savings account benefits. If an associated plan does not provide a particular benefit (e.g. maternity benefits) then the icon may appear faded; where an associated plan does provide the benefit, the icon may appear bolded. When a user moves a graphical pointer (e.g., a computer mouse) over an icon, a pop-up is displayed that includes brief information (e.g., "YES" or "NO") related to the insurance plan benefit. When the graphical pointer is no longer over the icon, the pop-up may be removed.

In order to avoid presenting the user with a multitude of different health insurance plans, some of which may not be relevant, the recommendation server 12 (e.g., running a recommendation tool or application) filters a total number of health insurance plans potentially available to a user down to a limited number (e.g. 25 health insurance plans) that have been pre-identified according to specific criteria (e.g. plans available in a zip code, best sellers, sponsored plans, featured plans, etc.). The plans are then presented to the user in a specific order, as described in more detail below. Accordingly, in an example embodiment, more relevant and appropriate health insurance plans are identified and displayed to the user before less relevant plans are displayed. The sequence in which the health insurance plans are recommended and displayed may depend, inter alia, on a geographical location of the user, historical insurance plan data related to the health insurance plans available, medical data associated with a user, plan benefit requirements, the likelihood of an insurer/carrier of approving the user, or the like. In an example embodiment, educational information (e.g., which is stored in the database 14) is optionally provided or presented to the user by the recommendation server 12.

Figure 2:
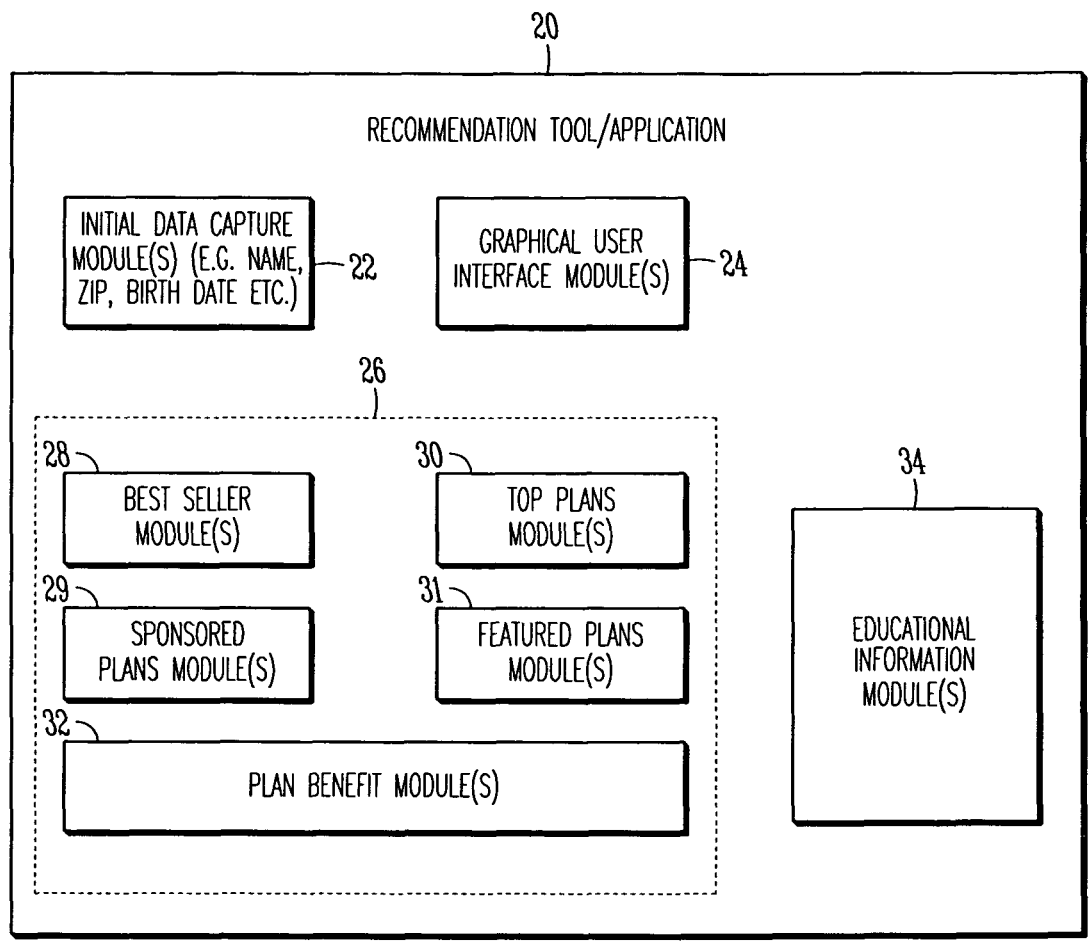
FIG. 2 shows example functional modules of a recommendation tool or application of the system of FIG. 1.

FIG. 2 shows example functional modules of a recommendation tool or application 20 which, for example, may be provided at the recommendation server 12. The recommendation tool 20 is shown to include an initial data capture module 22, one or more graphical user interface (GUI) modules 24, and one or more processing module 26 which may process application data to identify a recommended group (e.g. 1-25) of health insurance plans from a plurality of available health insurance plans. The processing module 26 works in conjunction with the GUI module 24 to display health insurance plan information in a logical and easily understandable format to the user. The processing module 26 may comprise a best seller module 28, a sponsored plans module 29, a top plans module 30, a featured plans module 31, and a plan benefit module 32.

Referring to FIG. 3, reference 40 generally indicates an example Graphical User Interface (GUI) for capturing application details or information input by a user into a client device (e.g. the client devices 18). The GUI 40 includes a form 42 for a user to enter demographic details in order to enable the recommendation tool 20 to identify health insurance plans for which the user is eligible. Accordingly, the form 42 includes a facility for the user to enter details concerning a spouse, one or more children, gender, date of birth, details on tobacco usage, fulltime college student details, or any other relevant information which may be required to identify one or more relevant health insurance plans. Further, as health insurance plans may be geographically restricted, a zip code entry field 44 allows the user to enter a zip code where he or she is resident. If the zip code spans multiple counties, and available health insurance products are restricted by county, then a further window may appear in which a user selects his/her county. This demographic data (gender, date of birth, tobacco usage, and zip code) is the minimum required to generate the most accurate quotes on available health insurance products. In response to the data, the recommendation tool 20 may identify a plurality of available insurance plans that are available to the user.

Once the user has entered the information in the GUI 40, a "Get Quotes" button 46 may be activated. In response thereto, as described in more detail below, the recommendation tool 20 may identify a recommended group of insurance plans from the available insurance plans based on historical insurance plan data. For example, the historical insurance plan data may cluster together health insurance plans that historically (based on data previously collected on the platform and stored in the identification server database 14) have approved users with medical histories similar to the user. The recommended group of insurance plans is then presented or displayed to the user via a GUI 50 (see FIG. 4). The GUI 50 comprises a plurality of insurance plan display zones 52, 54 (only two of which are shown by way of example in FIG. 4). In an embodiment, the display zones are substantially identical.

Figure 5:
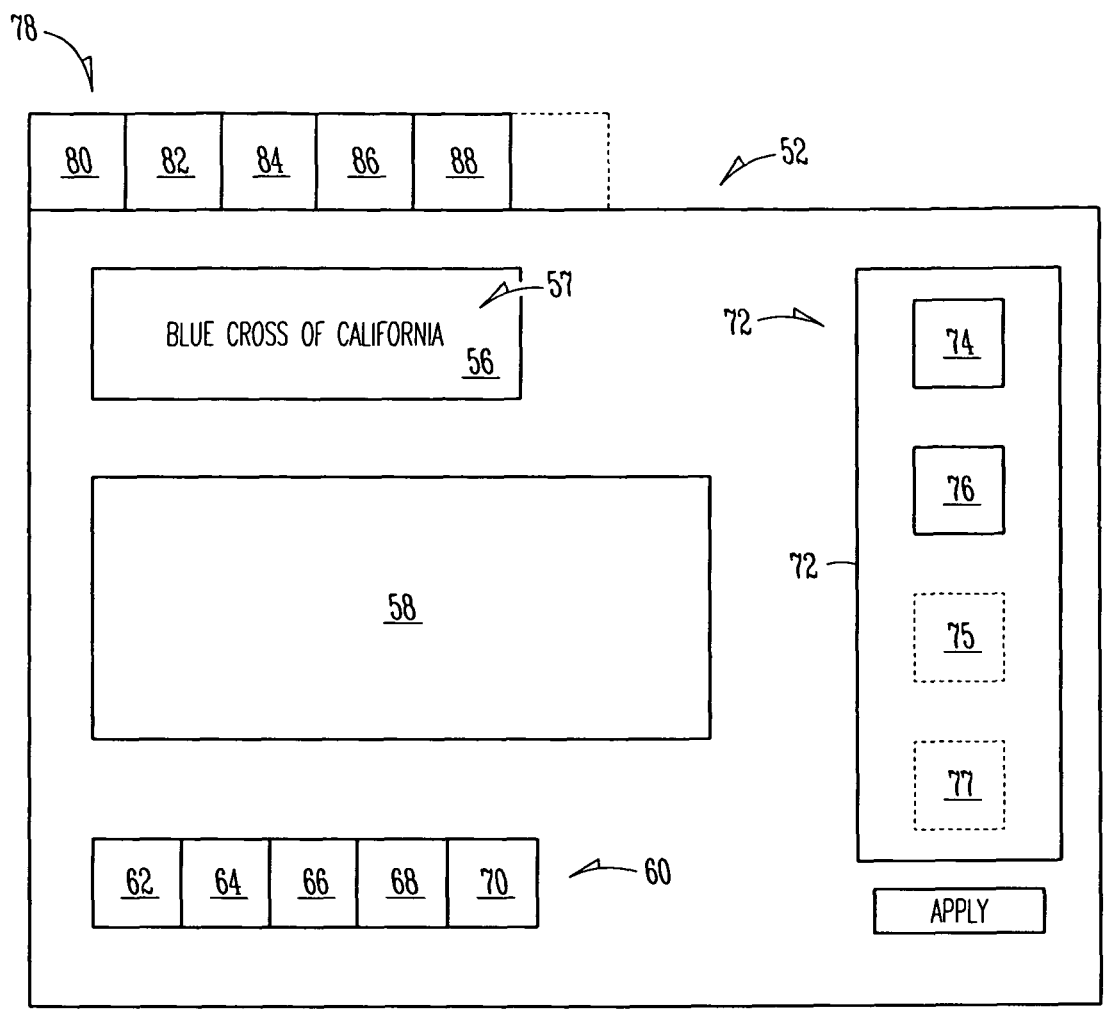
FIG. 5 shows an insurance plan display zone of the GUI of FIG. 4.

As shown in FIG. 5, the insurance plan display zone 52 is shown to include an insurance plan icon 56 to identify the carrier (e.g. Blue Cross of California). As shown by reference 71, the GUI 50 may also identify the name of the particular insurance plan recommended to the user (e.g., "Active Start Plan 35" associated with display zone 52 and "Shield Spectrum PPO Savings Plan 4000" associated with display zone 54). Further, each insurance plan display zone 52, 54 may include a text display zone 58 including, for example, details of plan highlights. The plan highlights typically are in the form of a text providing details of highlights or relevant aspects of the particular health insurance plan. Further, an insurance plan summary zone 60 is provided to identify a plan type (details of which are shown in display area 62), a deductible (details of which are displayed in display area 64), a co-insurance (details of which are displayed in display area 66), an office visit (details of which are displayed in display area 68), and a monthly premium (details of which are displayed in display area 70). It will be appreciated that the information provided in the insurance plan summary zone 60 may be provided in a different sequence. Thus, the display areas 62, 64, 66, 68, and 70 may appear in any sequence within the insurance plan summary zone 60.

Figure 6:
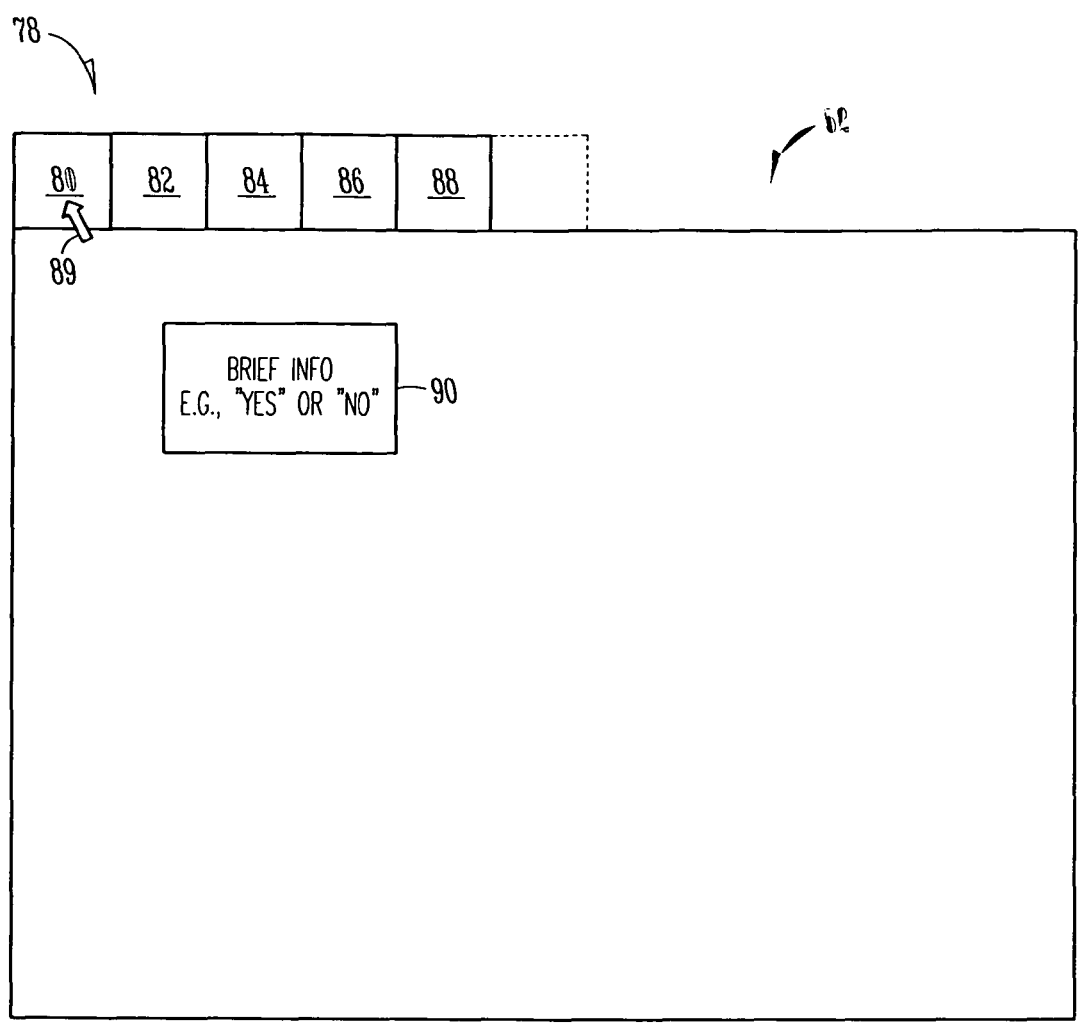
FIG. 6 shows a brief information window displayed when the user "mouses over" an icon of the GUI of FIG. 4.
Figure 7:
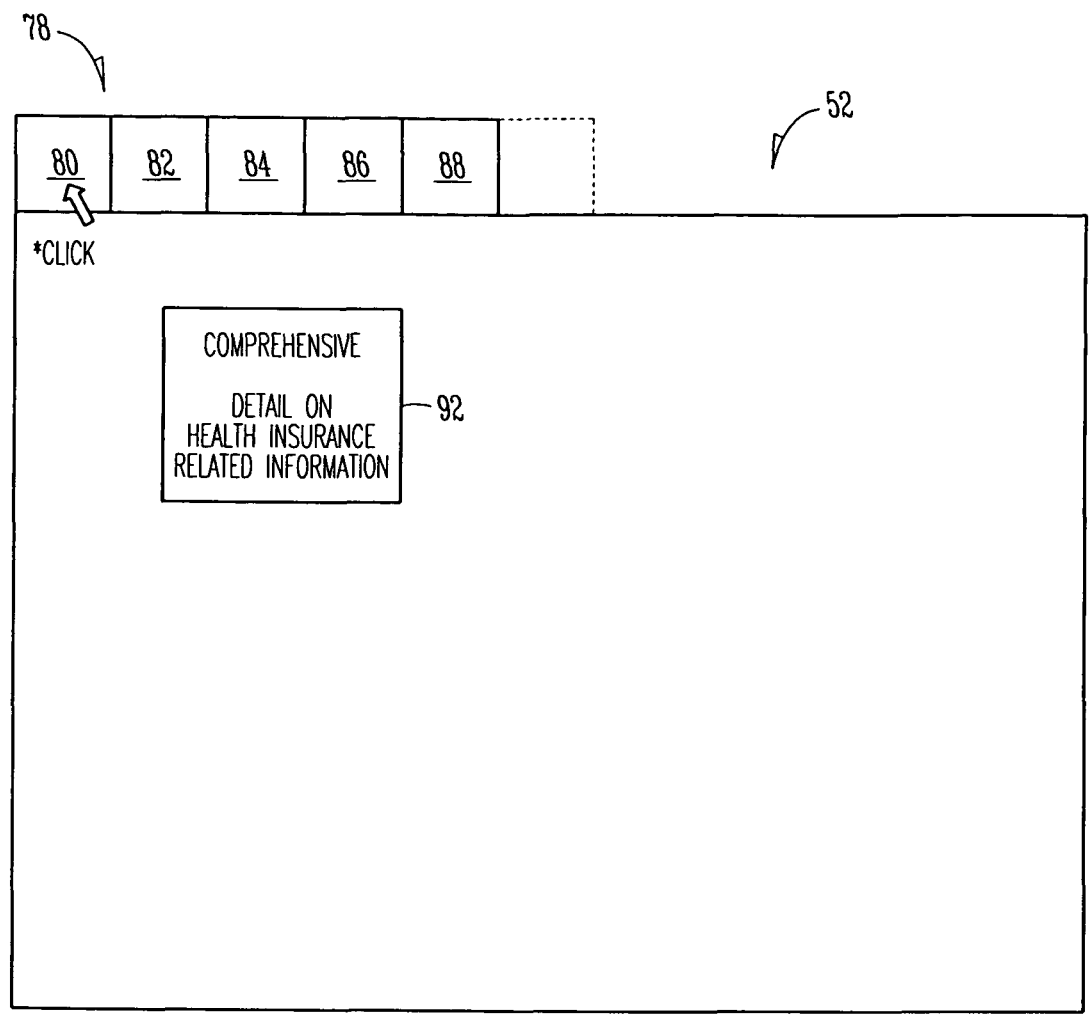
FIG. 7 shows a comprehensive detail window displayed when the user clicks an icon of the GUI of FIG. 4.

In addition, an active icon zone 72 is provided to identify that an insurance plan is a best seller insurance plan (e.g. by providing an icon 76), and to identify if the insurance plan is a sponsored insurance plan (e.g. by providing an icon 74). Further icons such as a featured plan icon 75 and/or a top 25 icon 77 may optionally be included in the icon zone 72. Further, a plurality of icons may be arranged in an icon group 78 wherein each icon of the icon group 78 is associated with a health insurance benefit of the health insurance plan appearing in display zone 52. When a user moves a graphical pointer (e.g. a mouse) over an icon of the icon group 78, a pop-up window may be displayed including brief information related to the insurance plan benefit and, when the graphical pointer is no longer over the icon, the pop-up window may be removed. For example, the icon group may include a prescription drug coverage icon 80 to identify that the associated health insurance plan includes prescription drug coverage, a maternity icon 82 to identify that an associated plan provides maternity benefits, a fee identification icon 84 to identify that the associated health insurance plan has no application fee, an electronic signature icon 86 to identify that an application for the associated health insurance plan can be digitally signed, a health savings account (HSA) icon 88 to identify that the associated health insurance plan provides health saving account benefits, or any other icons that include brief information related to an insurance plan benefit. For example, as shown in FIG. 6, when the user "mouses over" (see arrow 89) the prescription drug coverage icon 80, a brief information window 90 (e.g. a popup window) may be displayed providing brief information. For example, in an example embodiment, the brief information may be either a "Yes" or "No" to identify whether or not the health insurance plan includes prescription drug coverage. However, as shown in FIG. 7, if a user clicks (e.g. clicks using a computer mouse) on the prescription drug coverage icon 80, a comprehensive detail window 92 may be displayed providing more comprehensive details on the specific health insurance plan benefit. In a similar fashion, when a user moves a graphical pointer over any one of the other icons 82-88 a brief information window 90 may be displayed and, when a user clicks on any one of the insurance plan benefit icons 80-88, the comprehensive detail window 92 may be displayed.

When a user clicks on the sponsored icon 74, a window (e.g. a popup window) may be generated that provides detail or information on sponsored insurance plans. An example of such a sponsored insurance plan window is shown in FIG. 8. Likewise, when a user clicks on the best seller icon 76, a best seller window (e.g. a popup window) may be displayed including comprehensive information on the designation of the insurance plan as a best seller (see FIG. 9A). As mentioned above, in certain circumstances further icons such as the featured plan icon 75 and the top 25 icon 77 may be provided in the icon zone 72. When a user clicks on the featured plans icon 75, a featured plans window (e.g. a popup window) may be displayed including comprehensive information on the designation of the insurance plan as a featured plan (see FIG. 9B). Likewise, when a user clicks on the top 25 plans icon 77, a top 25 plans window (e.g. a popup window) may be displayed including comprehensive information on the designation of the insurance plan as a top 25 plan (see FIG. 9C).

Returning to the FIG. 4, it will be noted that the GUI 50 allows a user to compare individual and family health insurance plans (as shown by arrow 94). A "Select By" function (see arrow 95) allows a user to select Top 25 Plans 96, All Plans 98, a Plan Adviser 100, and a Custom Search 102. In an embodiment, a "Sort By" function (see arrow 97) allows a user to sort results in easy to comprehend and relevant categories such as: "ehealth's Picks 99, price 101, company or plan carrier 103, and deductible 105. "eHealth's Picks" may present to the user the most demographically and statistically relevant set of plans for that user (e.g., as determined by the provider of the network based commerce system 10), combined with sponsored or featured plans.

When the user selects the Top 25 Plans 96 (which may also be shown as a default) the recommendation tool 20 performs certain functionality which determines an order in which the identified plans are displayed to the user via the GUI 50, as described in more detail below. In an embodiment, the user may alter the sequence in which the insurance plans are displayed.

Figure 10A:
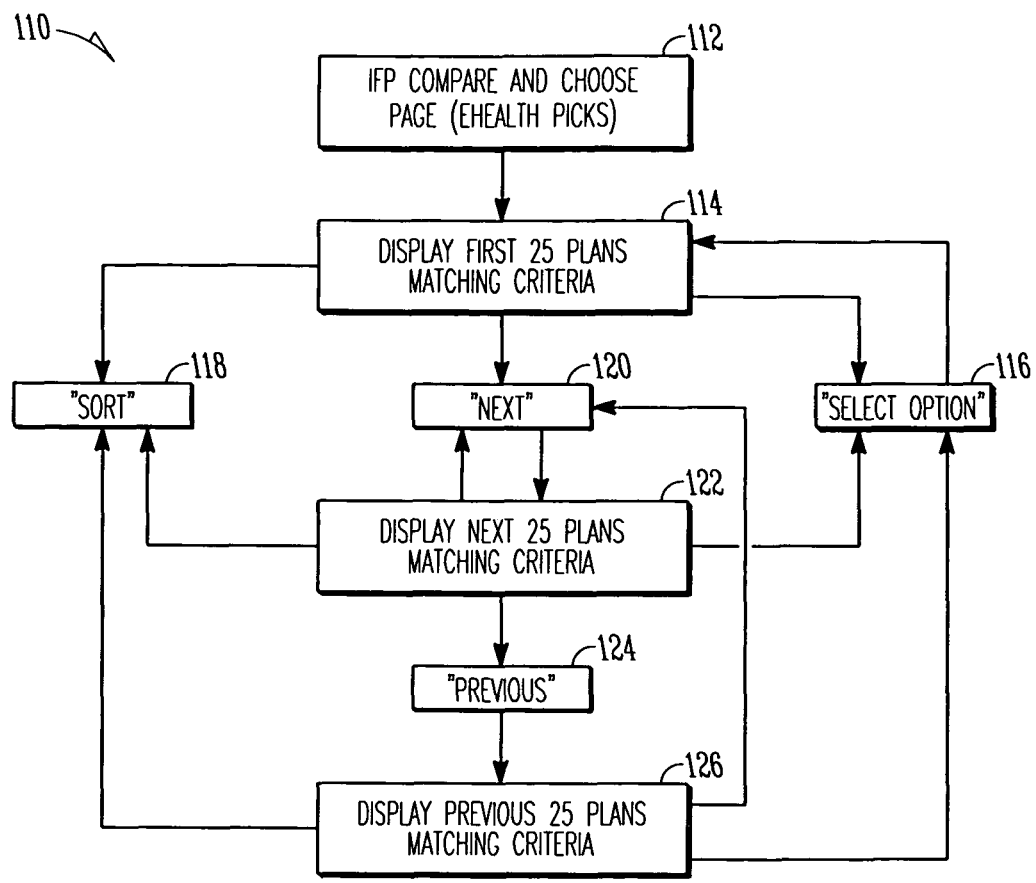
FIGS. 10A and 10B show methods, in accordance with example embodiments, to present health insurance plans to a user.

Referring to FIG. 10A, reference 110 generally indicates a method, in accordance with an example embodiment, to present health insurance plans to a user. As shown at block 112, if a user has selected the functionality of comparing individual and family health insurance plans, the method 110 displays the first 25 plans matching selected criteria as shown at block 114. A select option 116 is then provided for a user to select a particular plan. Further, a sort option 118 is provided to allow a user to sort the plans in a different order. The GUI 50 also includes a next button 120 which, when selected by the user, causes the recommendation tool 20 to display the next 25 plans matching the criteria (see block 122). As in the case of the block 114, the user is also provided with a sort option 118 and a select option 116. Further, a previous button 124 is provided to allow a user to browse a previously displayed screen. If the user selects the previous button 124, the previous 25 plans matching the criteria are displayed as shown at block 126.

Figure 10B:
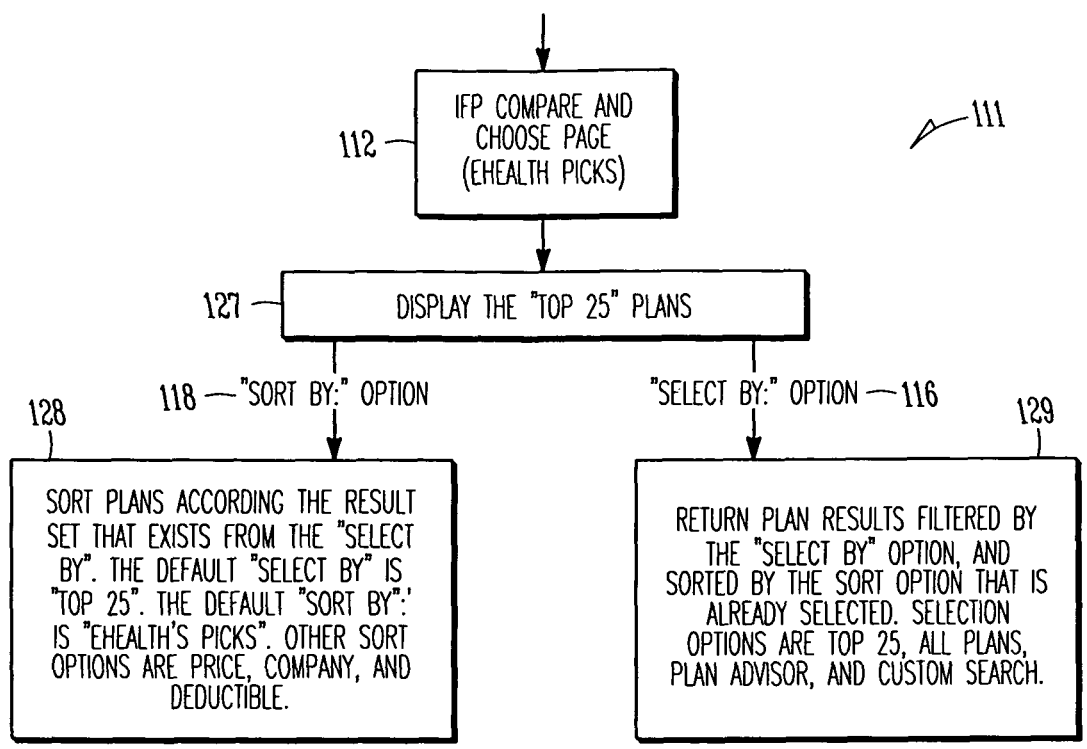

Referring to FIG. 10B, reference 111 generally indicates a method, in accordance with another example embodiment, to present health insurance plans to a user. The method 111 may provide an alternative to the method 110 and include some common functionality. The method 111 may also receive user input via the GUI 50. As shown by arrow 95 (see FIG. 4), a list of plans may be displayed to the user based on different selection criteria (e.g., "Select By" shown by arrow 95). In an example embodiment, the Top 25 Plans 96 may be displayed as a default and the user may then select one of the other options to select different criteria to display the plans. For example, the user may select All Plans 98, a Plan Advisor 100, or a Custom Search 102. It will be appreciate that these are merely example of display criteria. Thus, as shown by block 129 in FIG. 10B, the method 111 may return and display plan results filtered using the "Select By" functionality. These display plans may then be sorted by the "Sort By" functionality (see arrow 97 in FIG. 4).

When a user selects the sort option 118 (see FIG. 10B and arrow 97 in FIG. 4), the method 111 then sorts the plans currently selected by the "Select By" functionality (see arrow 95). In particular, dependent upon which particular sort button has been selected, the user selected plans may be sorted and displayed. In an example embodiment, the default "Sort By" option is shown to be "Ehealth's Picks 99. Other example options are shown to be sort by, price 101, company or plan carrier 103, and deductible 105).

Figure 11:
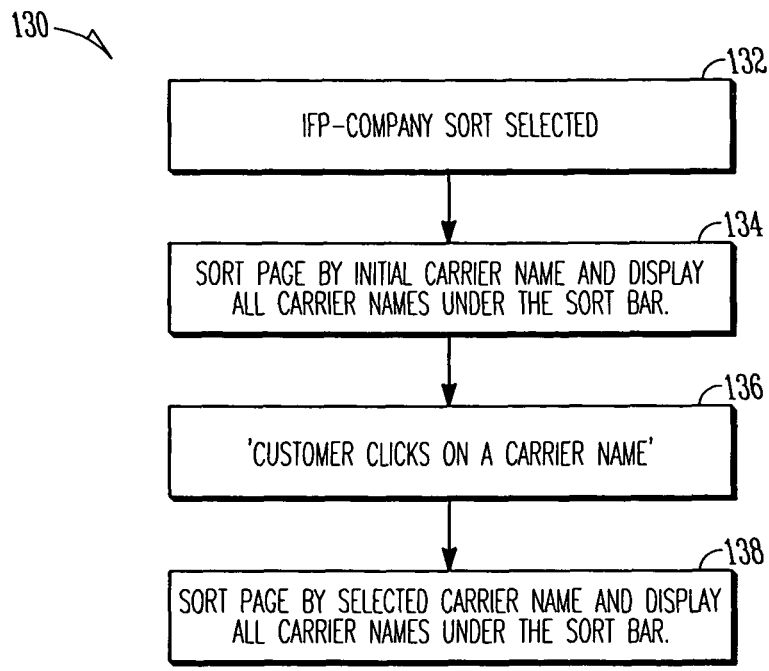
FIG. 11 shows an example method which is performed when the user selects a sort option.

FIG. 11 shows an example method 130 which is performed when the user selects the sort option 118. As shown at block 132, a user first selects a company sort whereafter the data is sorted by initial carrier name and all carrier names are then displayed under a sort bar (see block 134). If a customer selects a carrier or provider name (see arrow 136), the data is then sorted by the selected carrier name and all carrier names are displayed under the sort bar see block 136. The aforementioned is merely example functionality that the recommendation tool 20 may provide. When the example functionality of the methods 110 and 120 is selected, the sequence in which the insurance plan display zones 52, 54 are displayed is changed.

Figure 12:
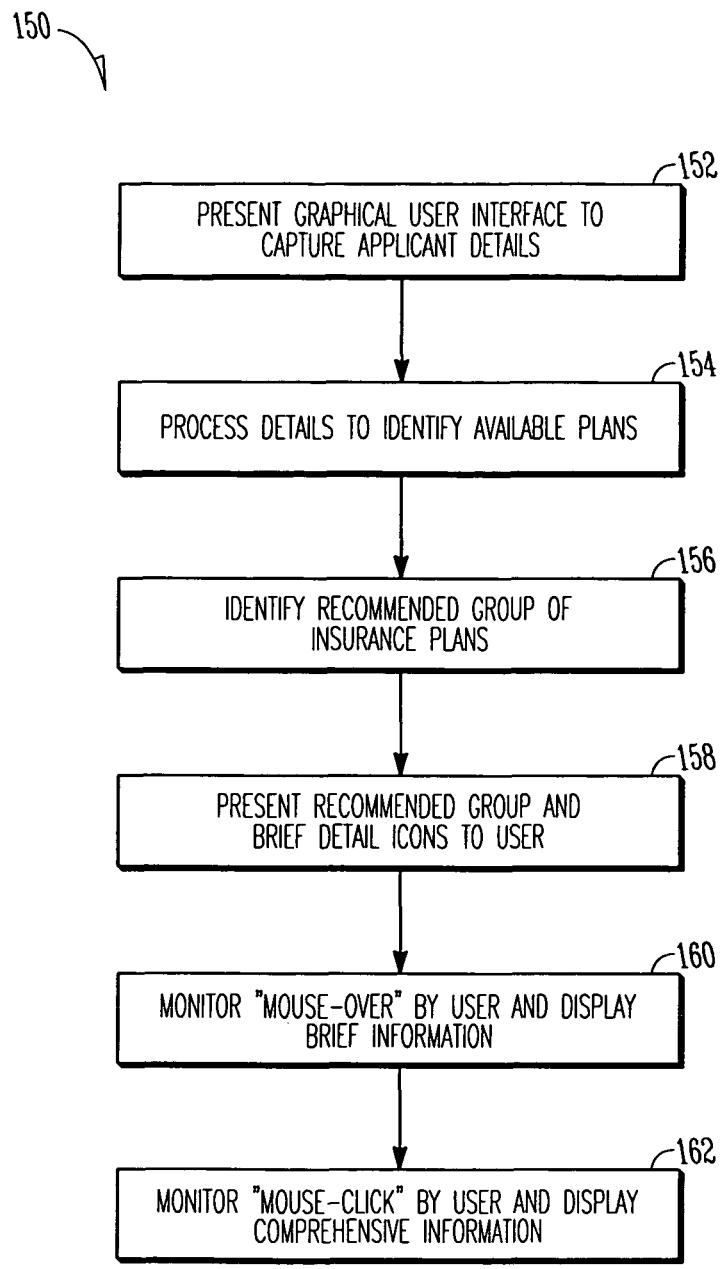
FIG. 12 shows an example method of communicating insurance information to a user via a network-based system.

Referring to FIG. 12, an example method 150 of communicating insurance information to a user via a network-based system is shown. As shown at block 152, the method 150 may commence by presenting a graphical user interface (GUI) to the user (see for example the GUI 40 shown in FIG. 3) to capture demographic details from a user. Thereafter, as shown at block 154, the demographic details are processed to identify a plurality of available insurance plans which the user is eligible for (see block 154). As the particular health insurance plans and the particular health insurance providers typically differ from one geographical region to another (e.g. from one state to another state) it may be required to identify the geographical region in which the user is located. Accordingly, the method 150 may capture this information by requesting a zip code from the user (see the zip code entry field 44 in FIG. 3). Thereafter, once all the potential health insurance plans available to the user have been identified, the method 150 may identify a group of health insurance plans (see block 156). For example, the method 150 may identify the top 25 health plans, or best sellers. In example embodiments, as described in more detail below, best seller health insurance plans, sponsored health insurance plans, featured insurance plans and top 25 health insurance plans may be displayed to the user prior to displaying other health insurance plans. Once the group of health insurance plans has been identified, they are then communicated to the user for display on the client device. In an embodiment, each of the recommended insurance plans is displayed in an insurance plan display zone 52 and information associated with each associated plan may be accessible to the user via the icon group 78. As described herein before, the icons 80-88 may provide brief or comprehensive information depending upon whether the user "mousse-over" or "mouse-clicks" on an icon (see FIGS. 6 and 7).

Figure 13:
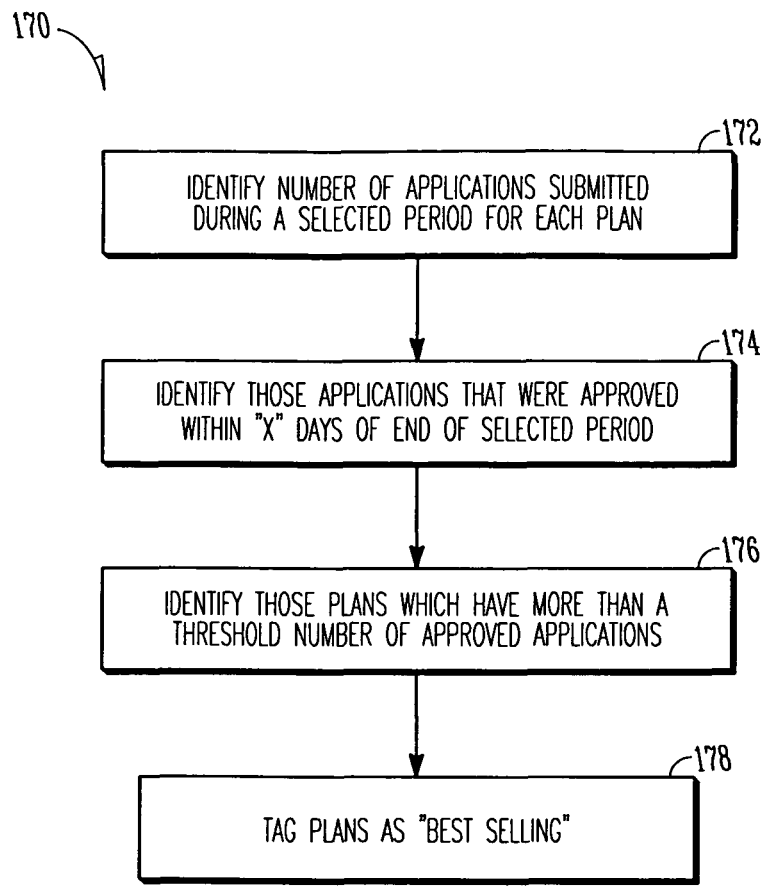
FIG. 13 shows a method, in accordance with an example embodiment, to identify one or more best seller health insurance plans.

Referring to FIG. 13, reference 170 generally indicates a method, in accordance with an example embodiment, to identify one or more best seller health insurance plans. As shown at block 172, the method 170 may identify a number of applications submitted during a selected period (e.g. a quarter) for each particular health plan. In an example embodiment, the numbers of applications are sorted into geographical regions based on zip codes. As shown at block 174, the method 170 may identify those applications that were approved by the carrier within a given time period (e.g. the quarter). Thereafter, those particular health insurance plans which have more than a threshold number of applications submitted during the time period may be identified as shown at block 176. Accordingly, by identifying only plans with more than a given threshold number of approved applications, the reliability of the data may be enhanced. As shown at block 178 those plans meeting the aforementioned criteria may be tagged or marked as the best seller health insurance plans. It will be appreciated that the method and the data used to process the applications may be geographically dependent. Thus, the identified best seller health insurance plans may differ from one geographical area to another geographical area. Further, it will be appreciated that the recommended group of health insurance plans is based on historical insurance plan data. In an example embodiment, already completed and approved applications/contracts are used to determine which particular health insurance plans are the best seller health insurance plans.

In an example embodiment, the method 170 includes, for each calendar quarter, monitoring a number of submissions or applications for each particular health insurance plan. Thereafter, all submissions or applications that were approved within 30 days of the quarter end are identified as eligible best seller health insurance plans. Best seller plans may be separated into subcategories based on the user's needs: a single user with families, a single parent user, user s that are couples, and so on. When performing the method 170, if two or more health insurance plans have the same number of applications submitted and approved, the best seller plan selected for display may be a plan with the lowest deductible, or with the lowest premium, or the plan or where the health insurance carriers close ratio (number of applications approved relative to the number of applications received) is smaller, or a health insurance plan with a lowest premium. It will however be appreciated that any other rules or criteria may be used to determine the sequence in which the health insurance plans are displayed in the GUI 50.

Figure 14:
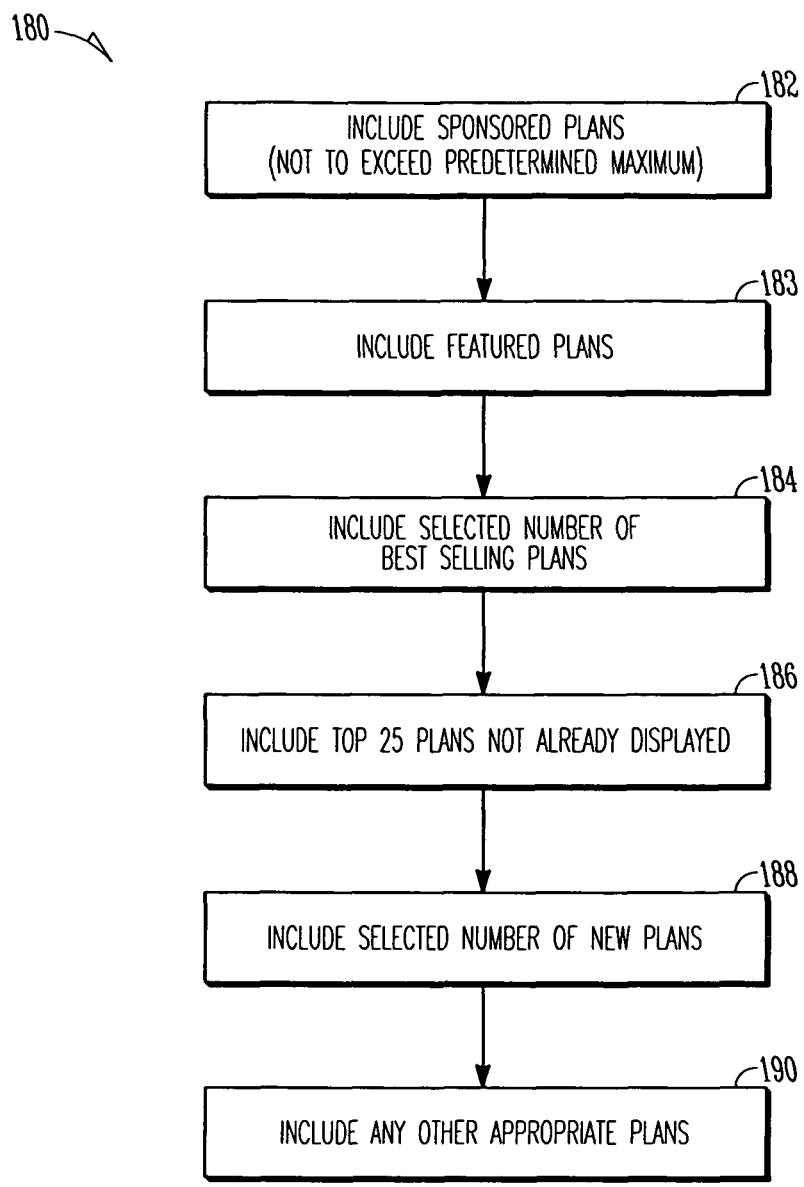
FIG. 14 shows a method, in accordance with an example embodiment, to identify top 25 health insurance plan providers or carriers.
Figure 15:
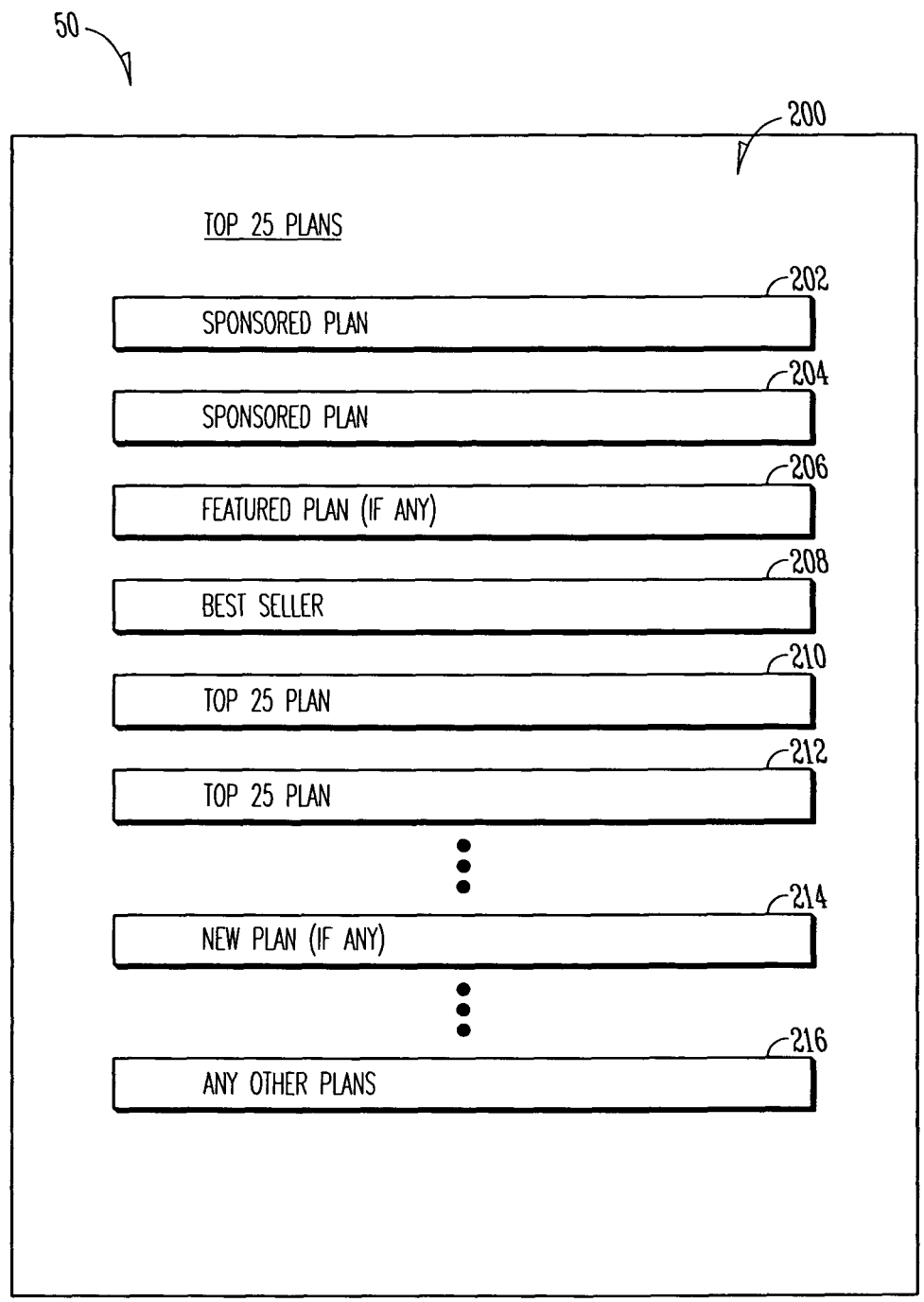
FIG. 15 shows a GUI displaying an example sequence of health insurance plans to a user.

Referring to FIG. 14, reference 180 generally indicates a method, in accordance with an example embodiment, to identify health insurance plans. FIG. 15 shows an example sequence in displaying health insurance plans generated by the method 180. As shown at block 182, a first plan included in a recommended group 200 (see FIG. 15) of health insurance plans may be a sponsored plan 202. It will be appreciated that a particular plan may fall into more than one category of plans. For example, a plan may be a sponsored plan and a best seller plan and/or a featured plan, and so on. When a plan falls into more than one category, more than one icon may then be displayed. For example, if a plan is a sponsored plan and a best seller plan then both the best seller icon 76 and the sponsored plan icon 74 may be displayed (see FIG. 5). It will be appreciated that the number of plans in any particular category that are included in the GUI 50 may vary from embodiment to embodiment. In the example embodiment shown in FIG. 15, two sponsored or featured plans 202, 204 are displayed as the first and second recommended plans in the GUI 50.

As shown at block 183, one or more featured plans 206 may be included and, thereafter, as shown at block 184, one or more best seller health insurance plan(s) 208 may be included in the group of identified health insurance plans 200. In an example embodiment, a single best seller health insurance plans 208 follows the featured health insurance plan 206.

After the sponsored/featured/best seller health insurance plans 202-208 are included in the recommended group, the method 180 then includes a number of top 25 plans 210, 212 that have not already been included (see block 186). Thereafter, as shown at block 188, an allotment may be made for any new plans 214. New plan(s) 214 may be those plans that have not been available long enough to provide reliable sales history and, accordingly, are not taken into account in determining the best seller plans. If any remaining slots (e.g., slot 216) are available, further appropriate plans for each individual carrier, regardless of the carrier, may be included in the recommended group 200.

Figure 16:
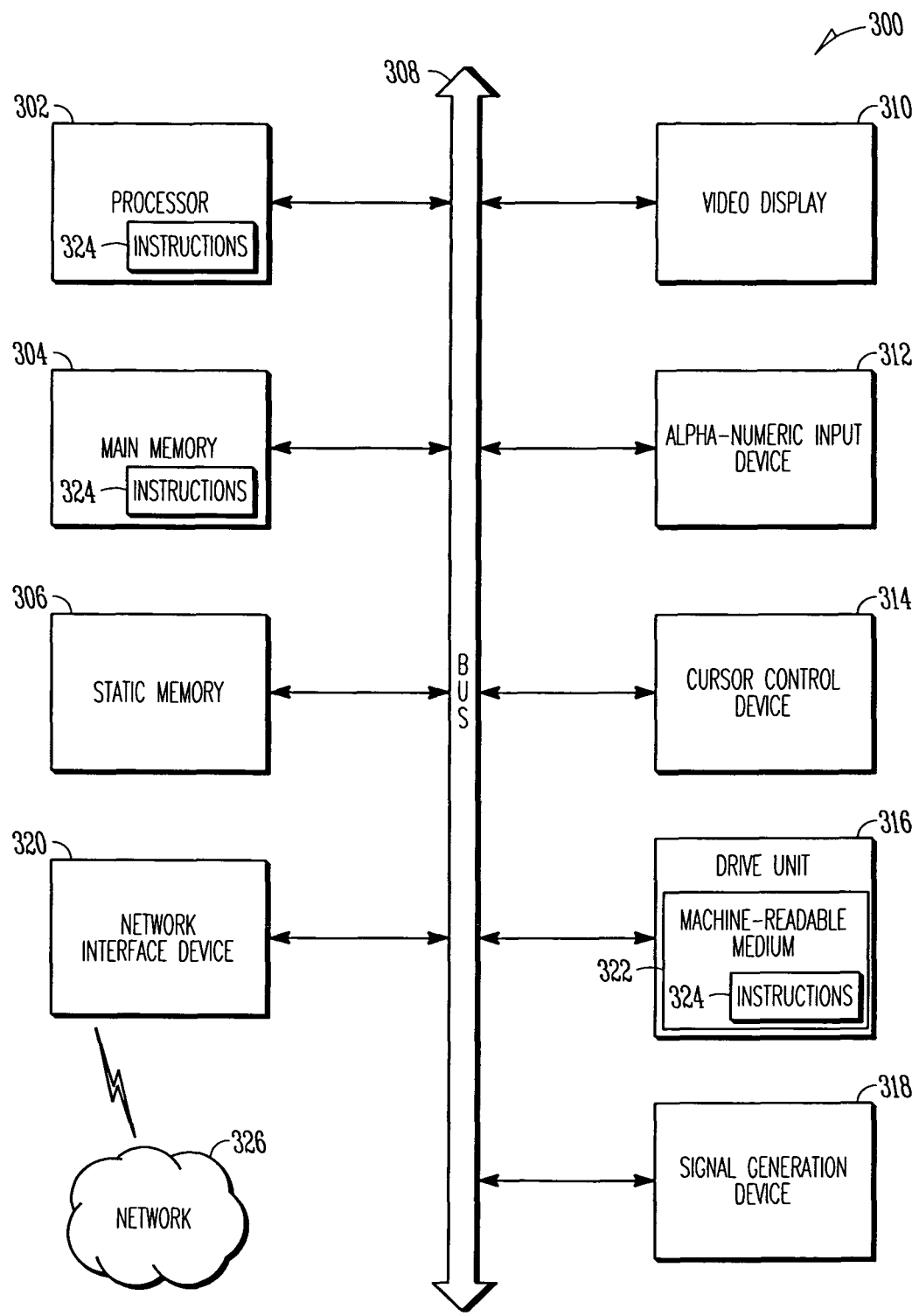
FIG. 16 shows a diagrammatic representation of a machine in the example form of a computer system for performing any one or more of the methodologies described herein.

FIG. 16 shows a diagrammatic representation of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, or any machine capable of executing a set of instructions (sequential or otherwise) that specify actions to be taken by that machine. Further, while only a single machine is illustrated, the term "machine" shall also be taken to comprise any collection of machines that individually or jointly execute a set (or multiple sets) of instructions to perform any one or more of the methodologies discussed herein.

The example computer system 300 comprises a processor 302 (e.g., a central processing unit (CPU) a graphics processing unit (GPU) or both), a main memory 304 and a static memory 306, which communicate with each other via a bus 308. The computer system 300 may further comprise a video display unit 310 (e.g., a liquid crystal display (LCD) or a cathode ray tube (CRT)). The computer system 300 also comprises an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 comprises a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an example embodiment to be a single medium, the term "machine-readable medium" should be taken to comprise a single medium or multiple media (e.g., a centralized or distributed database, and/or associated caches and servers) that store the one or more sets of instructions. The term "machine-readable medium" shall also be taken to comprise any medium that is capable of storing, encoding or carrying a set of instructions for execution by the machine and that cause the machine to perform any one or more of the methodologies of the present invention. The term "machine-readable medium" shall accordingly be taken to comprise, but not be limited to, solid-state memories, optical and magnetic media, and carrier wave signals.

Although the networked-based system 10 is described, by way of example, with reference to health insurance plans it will be appreciated to a person of skill in the art that it is not limited to health insurance plans or any other types of insurance plans.

Thus, a method and system of communicating insurance information to a user via a networked-based system have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computerized method of communicating insurance information to a user via a networked-based system, the method comprising:

receiving demographic details from a user device, the demographic details being entered by a user, the user device providing a graphical user interface;

processing the demographic details to identify a plurality of available insurance plans for the user;

using at least one processor, identifying a recommended group of insurance plans from the plurality of available insurance plans based on historical insurance plan data, the historical insurance plan data identifying which insurance plans received a number of applications exceeding a predefined threshold of applications; and communicating the recommended group to the user device, the recommended group to be presented to the user via the graphical user interface, the graphical user interface including an icon to identify insurance plans that received a number of applications exceeding the predefined threshold of applications.

2. The method of claim 1, in which the historical insurance plan data identifies which insurance plans received a highest number of applications and which were approved during a selected time period.

3. The method of claim 1, which comprises including insurance plans from a plurality of different insurance plan carriers, wherein an included insurance plan of each carrier has received a number of applications exceeding the predetermined threshold.

4. The method of claim 1, which comprises including at least one new insurance plan in the recommended group.

5. The method of claim 1, which comprises presenting at least one sponsored insurance plan first, the graphical user interface including a sponsored icon to identify the insurance plan as a sponsored plan.

6. The method of claim 1, wherein the historical insurance data includes geographical area data, the method comprising identifying the recommended group of insurance plans from available insurance plans available in a geographical area associated with the user.

7. The method of claim 1, wherein the graphical user interface comprises a plurality of insurance plan display zones, each display zone being associated with an insurance plan of the recommended group, each insurance plan display zone including:
- an insurance plan icon zone to identify a plan carrier;
- a text display zone to display insurance plan information associated with the insurance plan;
- an insurance plan summary zone to identify at least one of a plan type, a deductible, a coinsurance, an office visit, and a monthly premium; and
- an active icon zone to identify that the insurance plan is a best seller insurance plan or to identify the insurance plan as a sponsored insurance plan.

8. The method of claim 7, in which determining the best seller insurance plan comprises:
- monitoring a number of applications submitted via the network-based network for each of a plurality of insurance plans over a selected time period;
- monitoring which of the submitted applications are approved; and
- identifying the best seller insurance plan from the submitted applications that are approved.

9. The method of claim 1, which comprises:
- displaying a plurality of icons via the graphical user interface, the plurality of icons being associated with a health insurance plan and each icon being associated with a health insurance benefit of the associated health insurance plan;
- monitoring when a user moves a graphical pointer over an icon of the plurality of icons;
- displaying a window including brief information related to the health insurance plan benefit when the user moves the graphical pointer over the icon; and
- removing the window when the graphical pointer is no longer over the icon.

10. The method of claim 9, wherein the plurality of icons comprises at least one of:
- a prescription drug coverage icon to identify whether the associated insurance plan includes prescription drug coverage;
- a maternity identification icon to identify whether the associated insurance plan provides maternity coverage;
- a fee identification icon to identify whether the associated insurance plan has no application fee;
- an electronic signature icon to identify whether an application for the associated health insurance plan can be digitally signed; and
- a health savings account icon to identify whether that the associated insurance plan provides health savings account benefits.

11. The method of claim 10, in which the brief information includes one of "YES" and "NO".

12. The method of claim 9, which comprises:
- monitoring when a user clicks on an icon and, if so, displaying more comprehensive information than the brief information.

13. The method of claim 1, in which identifying the recommended group of insurance plans comprises displaying the recommended insurance plans in the following sequence:
- displaying at least one sponsored insurance plan;
- displaying at least one best seller insurance plan of each insurance plan provider;
- displaying a second best seller insurance plan of each insurance plan provider; and
- displaying at least one new insurance plan.

14. A non-transitory machine-readable medium embodying instructions which, when executed by the machine, cause the machine to:
- receive demographic details from a user device, the demographic details being entered by a user, the user device providing a graphical user interface;
- process the demographic details to identify a plurality of available insurance plans for the user;
- identify a recommended group of insurance plans from the plurality of available insurance plans based on historical insurance plan data, the historical insurance plan data identifying which insurance plans received a number of applications exceeding a predefined threshold of applications; and
- communicate the recommended group to the user device, the recommended group to be presented to the user via the graphical user interface, the graphical user interface including an icon to identify insurance plans that received a number of applications exceeding the predefined threshold of applications.

15. A system to communicate insurance information to a user via a networked-based system, the system comprising:
- at least one processor and a plurality of modules comprising instructions executable by the at least one processor, the modules comprising:
  - a graphical user interface module to provide a plurality of insurance plans to the user via a graphical user interface of a client device; and
  - a processing module to:
    - receive application details from the client device entered by the user via the graphical user interface;
    - process the application details to identify a plurality of available insurance plans for the user;
    - identify a recommended group of insurance plans from the available insurance plans based on historical insurance plan data, the historical insurance plan data identifying which insurance plans received a number of applications exceeding a predefined threshold of applications; and
    - communicate the recommended group to the user via the graphical user interface, the graphical user interface including an icon to identify insurance plans that received a number of applications exceeding the predefined threshold of applications.

16. The system of claim 15, wherein the graphical user interface comprises a plurality of insurance plan display zones, each display zone being associated with an insurance plan of the recommended group, each insurance plan display zone including:
- an insurance plan icon zone to identify a plan carrier;
- a text display zone to display insurance plan information associated with the insurance plan;
- an insurance plan summary zone identifying at least one of a plan type, a deductible, a coinsurance, an office visit, and a monthly premium; and
- an active icon to identify that the insurance plan is a best seller insurance plan or to identify the insurance plan as a sponsored insurance plan.

17. The system of claim 16, in which determining the best seller insurance plan includes:
- monitoring a number of applications submitted via the network-based network for each of a plurality of insurance plans over a selected time period;
- monitoring which of the submitted applications are approved; and
- identifying the best seller insurance plan from the submitted applications that are approved.

18. The system of claim 15, in which the graphical user interface module:

displays a plurality of icons via the graphical user interface, the plurality of icons being associated with a health insurance plan and each icon being associated with a health insurance benefit of the associated health insurance plan;

monitors when a user moves a graphical pointer over an icon of the plurality of icons;

displays a window including brief information related to the insurance plan benefit when the user moves the graphical pointer over the icon; and removes the window when the graphical pointer is no longer over the icon.

19. The system of claim 18, wherein the plurality of icons comprises at least one of:
   a prescription drug coverage icon to identify that the associated insurance plan includes prescription drug coverage;
   a fee identification icon to identify that the associated insurance plan has no application fee;
   an electronic signature icon to identify that an application for the associated health insurance plan can be digitally signed; and
   a health savings account icon to identify that the associated insurance plan provides health savings account benefits.

20. A computerized method of communicating insurance information to a user via a networked-based system, the method comprising:
   receiving application details from a user device, the application details being entered by a user, the user device providing a graphical user interface;
   using at least one processor, processing the application details to identify a plurality of available insurance plans for the user;
   presenting at least some of the available insurance plans to the user via the graphical user interface;
   displaying a plurality of icons via the graphical user interface, the plurality of icons being associated with a health insurance plan and each icon being associated with a health insurance benefit of the associated insurance plan;
   monitoring when a user moves a graphical pointer over an icon of the plurality of icons;
   displaying a window including brief information related to the insurance plan benefit when the user moves the graphical pointer over the icon; and
   removing the window when the graphical pointer is no longer over the icon.

21. The method of claim 20, wherein the plurality of icons comprises at least one of:
   a prescription drug coverage icon to identify that the associated insurance plan includes prescription drug coverage;
   a fee identification icon to identify that the associated insurance plan has no application fee;
   an electronic signature icon to identify that an application for the associated health insurance plan can be digitally signed; and
   a health savings account icon to identify that the associated insurance plan provides health savings account benefits.

22. The method of claim 21, in which the brief information comprises one of "YES" and "NO".

23. A non-transitory machine-readable medium embodying instructions which, when executed by a machine, cause the machine to:
   receive application details from a user device, the application details being entered by a user, the user device providing a graphical user interface;
   process the application details to identify a plurality of available insurance plans for the user;
   communicate at least some of the available insurance plans to the user via the graphical user interface;
   display a plurality of icons via the graphical user interface, the plurality of icons being associated with a health insurance plan and each icon being associated with a health insurance benefit of the associated insurance plan;
   monitor when a user moves a graphical pointer over an icon of the plurality of icons;
   display a window including brief information related to the insurance plan benefit when the user moves the graphical pointer over the icon; and
   remove the window when the graphical pointer is no longer over the icon.

24. A system to communicate insurance information to a user via a networked-based system, the system comprising:
   means for receiving application details from a user device, the application details being entered by a user, the user device providing a graphical user interface;
   means for processing the application details to identify a plurality of available insurance plans for the user;
   means for identifying a recommended group of insurance plans from the available insurance plans based on historical insurance plan data, the historical insurance plan data identifying which insurance plans received a number of applications exceeding a predefined threshold of applications; and
   means for communicating the recommended group to the user via the graphical user interface, the graphical user interface including an icon to identify insurance plans that received a number of applications exceeding the predefined threshold of applications.

* * * * *